United States Patent [19]

Yano et al.

[11] Patent Number: 4,858,215
[45] Date of Patent: Aug. 15, 1989

[54] INTEGRATED OPTICAL DISC PICKUP THAT ALLOWS VARIATIONS IN THE WAVELENGTH OF THE LASER BEAM

[75] Inventors: Seiki Yano, Kashihara; Hiroaki Kudo, Tenri; Haruhisa Takiguchi, Nara; Toshiki Hijikata, Nara; Shinji Kaneiwa, Nara, all of Japan

[73] Assignee: Sharp Kabushiki Kaisha, Osaka, Japan

[21] Appl. No.: 95,566

[22] Filed: Sep. 10, 1987

[30] Foreign Application Priority Data

Sep. 12, 1986 [JP] Japan .................................. 61-216214

[51] Int. Cl.$^4$ ................................................ G11B 7/00
[52] U.S. Cl. ....................................... 369/45; 250/201; 350/96.14; 369/46
[58] Field of Search ..................... 369/43–47, 369/112, 121; 350/96.13, 96.14; 250/201 DF; 358/342

[56] References Cited

U.S. PATENT DOCUMENTS 4,672,187  6/1987  Fujita et al. ..................... 250/201
4,720,824  1/1988  Hayashi ......................... 369/112 X
4,737,946  4/1988  Yamashita et al. ............. 250/201 X

OTHER PUBLICATIONS

T. Suhara et al., "An Integrated-Optic Disc Pickup Device," *Technical Digest of 5th International Conference on Integrated Optics and Optical Fibre Communication/11th European Conference on Optical Communication* (IOCC-ECOC '85), Venezia, Italy, Oct. 1–4, 1985, vol. 1, at pp. 117–120.

S. Ura et al., "An Integrated-Optic Disk Pickup Device," *Institute of Electronics, Information and Communication Engineers (IEICE) Technical Report*, vol. 85, No. 136, pp. 39–46 (Sep. 17, 1985) (in Japanese).

*Primary Examiner*—Robert L. Richardson
*Attorney, Agent, or Firm*—Bryan, Cave McPheeters & McRoberts

[57] ABSTRACT

An integrated optical disc pickup comprising an optical waveguide in the form of a insulation layer provided on the surface of a substrate, a semiconductor laser disposed outside the waveguide, a beam splitter of the transmission type and a Luneburg lens provided on the path of propagation of a laser beam from the semiconductor laser through the waveguide and arranged in the order mentioned in a direction away from the laser, a transmission grating provided on the path through the waveguide to be followed by the laser beam upon having its direction changed by the beam splitter after emanating from the laser, passing through the beam splitter and the Luneburg lens, being reflected from an optical disc disposed outside the waveguide and passing through the Luneburg lens, and first and second photodetectors disposed on the paths of propagation through the waveguide of two portions of the laser beam divided by the diffraction grating.

22 Claims, 2 Drawing Sheets

INTEGRATED OPTICAL DISC PICKUP THAT ALLOWS VARIATIONS IN THE WAVELENGTH OF THE LASER BEAM

BACKGROUND OF THE INVENTION

1. Field of the Invention

The present invention relates an an integrated optical disc pickup which is a key component of optical disc devices for recording or reproducing information.

2. Description of the Prior Art

Generally, integrated optical disc pickups comprise a system of a multiplicity of lenses, a beam splitter and photodetectors in combination.

However, the conventional optical pickup is cumbersome to assemble and adjust and is therefore costly, while the optical pickup, which is large-sized, has the drawback of requiring a prolonged access time.

To overcome the drawbacks, Nishihara et al. have proposed an integrated optical disc pickup (see IEICE (The Institute of Electronics, Information and Communication Engineers) Technical Report, OQE85-72 (1985), Vol. 85, No. 136, pp. 39–46. The proposed pickup includes a focusing grating coupler for focusing a laser beam on the optical disc and requires control of the absolute wavelength of the light source since the focusing characteristics of the coupler is dependent on the wavelength of the light source. Insofar as a semiconductor laser is used as the light source, accordingly, the proposed arrangement involves extreme difficulties and is infeasible.

SUMMARY OF THE INVENTION

The present invention provides an integrated optical disc pickup comprising (i) an optical waveguide in the form of a semiconductor layer or insulation layer provided on the surface of a substrate, (ii) a semiconductor laser disposed outside the waveguide, (iii) a beam splitter and a mode index lens provided on the path of propagation of a laser beam from the semiconductor laser through the waveguide and arranged in the order mentioned in a direction away from the laser, (iv) a diffraction grating provided on the path through the waveguide to be followed by the laser beam upon having its direction changed by the beam splitter after emanating from the laser, passing through the beam splitter and the mode index lens, being reflected from an optical disc disposed outside the waveguide and passing through the mode index lens, and (v) photodetector means disposed on the paths of propagation through the waveguide of the two portions of the laser beam divided by the diffraction grating.

According to the present invention, the laser beam from a semiconductor laser is focused on the surface of the optical disc by a mode index lens provided on the optical waveguide so as to accurately project a beam spot of optimum form onto the pit of the disc even when the absolute wavelength of the laser beam varies and to thereby obviate the necessity of strictly controlling the absolute wavelength of the laser beam.

According to the invention, the beam splitter is adapted to change the direction of the laser beam reflected from the disc surface and passing through the mode index lens again.

Upon the change of direction by the beam splitter, the laser beam is divided into two portions by a diffraction grating. Two photodetectors are arranged to receive the divided beam portions respectively.

DESCRIPTION OF THE PREFERRED EMBODIMENTS

Figure 1:
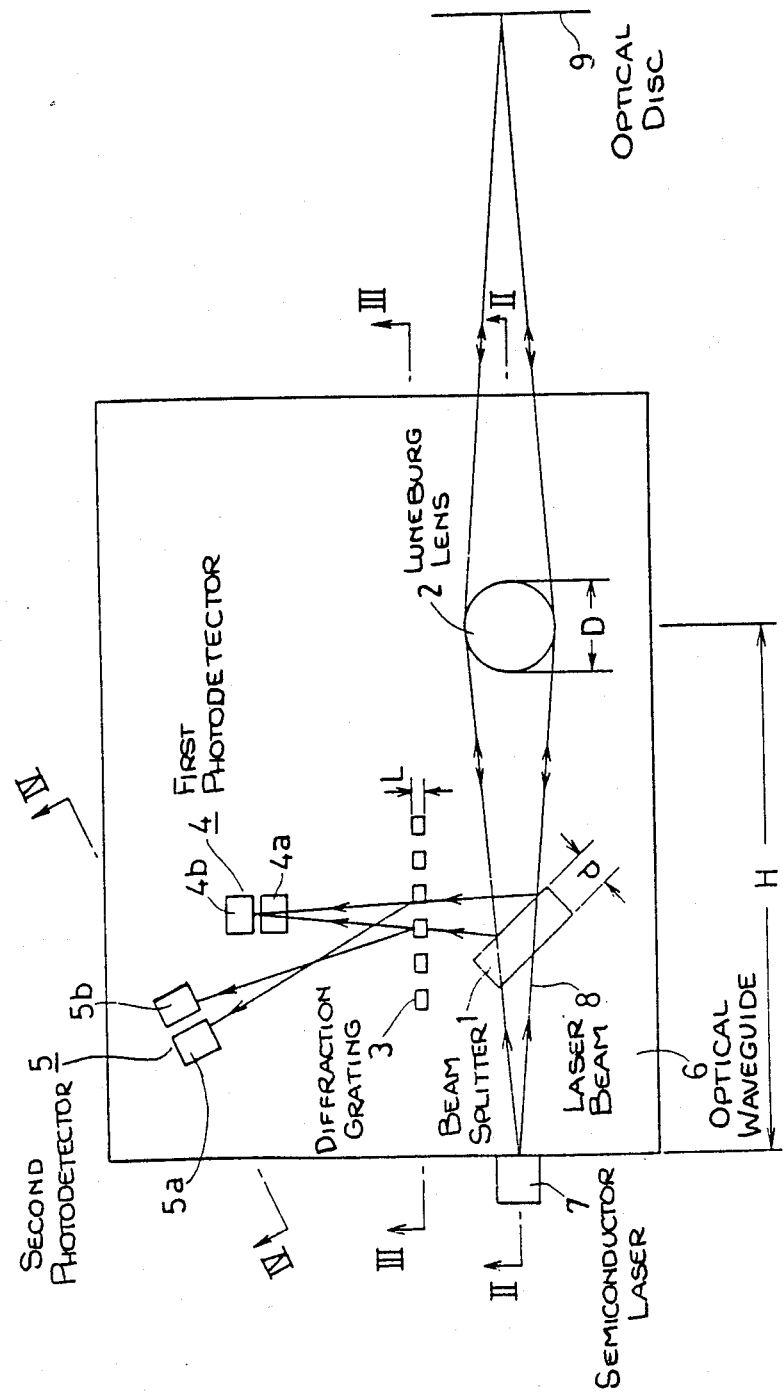
FIG. 1 is a diagram showing the construction of an integrated optical disc pickup embodying the invention.

The integrated optical disc pickup of the present invention consists essentially of an optical waveguide in the form of a semiconductor layer or insulation layer provided on the surface of a substrate, a semiconductor laser disposed outside the waveguide, a beam splitter and a mode index lens provided on the path of propagation of a laser beam from the semiconductor laser through the waveguide and arranged in the order mentioned in a direction away from the laser, a diffraction grating provided on the path through the waveguide to be followed by the laser beam upon having its direction changed by the beam splitter after emanating from the laser, passing through the beam splitter and the mode index lens, being reflected from an optical disc disposed outside the waveguide and passing through the mode index lens, and photodetector means disposed on the paths of propagation through the waveguide of two portions of the laser beam divided by the diffraction grating.

The substrate to be used in the invention is made of glass, Si or the like and is, for example, 5 mm in length, 3 mm in width and 1 mm in height.

The optical waveguide of the invention is a semiconductor layer of GaAlAs, GaInAlP or the like, or an insulation layer of $Si_3N_4$, $SiO_2$ or the like. For example, the $Si_3N_4$ layer is preferably 0.5 $\mu m$ to 2.0 $\mu m$, more preferably 1 $\mu m$ in thickness.

A semiconductor laser is disposed on one side of the waveguide externally thereto. On the other side of the waveguide opposite to the laser and away from the waveguide, an optical disc is positioned with its surface perpendicular to the path of propagation of the laser beam from the laser.

Examples of useful semiconductor lasers are those of GaAlAs type, InGaAlP type or InGaAsP type.

Preferably, the optical disc of 0.158 $\mu m$ in the depth of its pits.

A beam splitter is provided in the optical waveguide, and a mode index lens on the waveguide. An example of a useful beam splitter is a beam splitter of the transmission type, 1 mm in width, 1 $\mu m$ in thickness and 1.5 mm in length, formed by mesa-etching an optical waveguide of $Si_3N_4$ film photolithographically. Also usable is a beam splitter of the diffraction grating type.

Examples of useful mode index lenses are a Luneburg lens, geodesic lens, etc. The Luneburg lens is formed, for example, by depositing $As_2S_3$ on the waveguide of $Si_3N_4$ by vacuum evaporation, and is 1 $\mu m$ in thickness at its center and 1.5 mm in diameter and 3 mm in focal length. The geodesic lens is formed on the waveguide in the shape of a hemisphere by the diffusion of Ti.

The diffraction grating to be used in the invention is, for example, a transmission grating formed on the waveguide. The transmission grating is formed by depositing $As_2S_3$ on the waveguide of $Si_3N_4$ film by vacuum deposition and making pits, 20 μm in width and arranged at a pitch of 4 μm, in the deposit by the photolithographical method.

The photodetector means of the invention comprises a first photodetector for detecting a focus servo signal from the optical disc and a second photodetector for detecting a tracking signal from the optical disc. The second photodetector is so disposed that one of the two laser beam portions divided by the diffraction grating, i.e. the primary diffracted beam, is incident thereon. More specifically, the photodetector means comprises two photodiodes formed on the waveguide of $Si_3N_4$ film. Each photodiode comprises two divided portions spaced apart.

According to the present invention, the optical pickup is provided with means of driving the pickup transversely to the track of the optical disc and also in the direction of the optical axis thereof. The pickup is positioned perpendicularly to the plane of the disc.

The Luneburg lens, which is 3 mm in focal length, is positioned at a distance of 3.0 mm from the semiconductor laser and focuses a beam spot, 1 μm in diameter, on the surface of the disc at the beam focused position.

A specific embodiment of the invention will be described below with reference to FIG. 1. However, the invention is in no way limited by the embodiment.

The integrated optical disc pickup shown in FIG. 1 consists essentially of a beam splitter 1, a Luneburg lens 2, a diffraction grating 3 and two photodetectors, i.e. first and second photodetectors 4 and 5.

Figure 2:
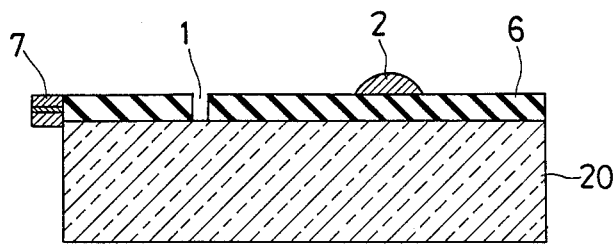
FIG. 2 is a view in section taken along the line II—II in FIG. 1.

To fabricate the pickup device, an $Si_3N_4$ of 1 μm in thickness is first deposited on the entire surface of a glass substrate 20 by vacuum evaporation to form an optical waveguide 6. As seen in FIG. 2, the beam splitter 1 is in the form of of a recess, 1 mm in width d and 1.5 mm in length, formed by mesa-etching the waveguide 6 by the usual photolithographical process. This beam splitter 1 of the transmission type reflects the beam at the surface defining the recess. Alternatively, some other beam splitter is usable.

Figure 4:
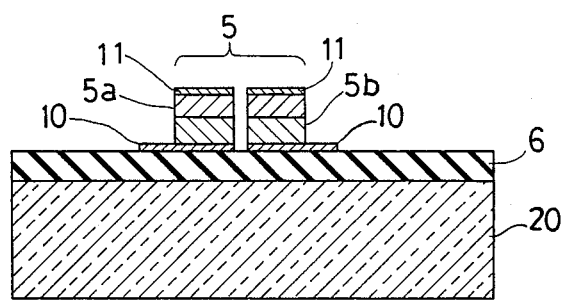
FIG. 4 is a view in section taken along the line IV—IV in FIG. 1.

Next, the first and second photodetectors 4, 5 are formed. As shown in FIG. 4, an electrode having a window or a transparent electrode, serving as a P side electrode 10, is formed on the waveguide 6 by depositing Al thereon by vacuum evaporation. P-type and N-type polysilicons are then successively grown, each to a thickness of 2 μm, over the electrode 10 by the chemical vapor deposition (CVD) process. Subsequently, an electrode 11 is formed in the same manner as the electrode 10. The polysilicon layers of the P and N types are thereafter etched by the usual photolithographical process except for the required P, N junction portions to provide the first and second photodetectors 4 and 5. These photodetectors 4 and 5 each comprise two divided photodiodes, i.e., a pair of photodiode devices 4a, 4b and a pair of photodiode devices 5a, 5b, respectively. The photodiode devices in each pair are spaced apart by a distance of 10 μm.

Next, $As_2S_3$ (arsenic sulfide) is vacuum-deposited on the waveguide 6 by the shadow mask process to form the Luneburg lens 2 which is shown in FIG. 2 in section. The lens is 1 μm in thickness at its center, 1.5 mm in diameter D and 3 mm in focal length. The Luneburg lens 2 thus formed is at a distance H of 3.0 mm from the light source, i.e., a semiconductor laser 7. The use of the Luneburg lens is not limitative; also usable is a geodesic lens formed by diffusing Ti in a hemispherical shape or some other mode index lens.

Figure 3:
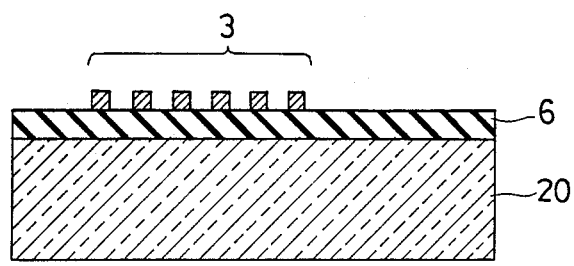
FIG. 3 is a view in section taken along the line III—III in FIG. 1.

To form the diffraction grating 3 next, $As_2S_3$ is deposition to a thickness of 1 μm by vacuum deposition. A transmission grating having pits at a pitch of 4 μm as seen in FIG. 3 is then formed in the deposit by the photolithographical process. The grating is 20 μm in width L (FIG. 1). A beam splitter is usable as the diffraction grating in place of the transmission grating. In this way, the pickup device is fabricated.

The pickup device of the foregoing construction and having the semiconductor laser 7 fixed thereto is mounted on a frame (not shown) which is movable transversely to the track of an optical disc and along the optical axis thereof. The disc is positioned perpendicularly to the device.

In this arrangement, the distance H between the laser 7 and the Luneburg lens 2 is 3.0 mm.

The laser beam propagates through the pickup in the following manner.

First, the laser beam (for example, 0.78 μm in wavelength) 8 emanating from the semiconductor laser 7 is incident on the optical waveguide 6, whereupon the beam 8 passes through the beam splitter 1 and then through the Luneburg lens 2 and reads information from a pit of the optical disc 9. The beam then returns to the beam splitter 1 through the lens 2 and impinges on the grating 3, whereby the beam is divided into two portions. One beam portion is incident on the first photodetector 4, giving a focus servo signal. The other beam portion, i.e. the primary diffracted beam, impinges on the second photodetector 5 to produce a tracking signal.

According to the embodiment described above, the beam from a semiconductor laser is focused on the surface of the optical disc by a Luneburg lens, so that the beam focusing characteristics are not dependent on the wavelength of the laser beam unlike the prior art, making it possible to accurately project a beam spot of optimum form onto the pit of the disc and eliminating the need to strictly control the absolute wavelength of the laser beam. Further in the case of the focus servo signal detecting method using a grating, it is possible to electrically correct the zero point of the photodetector, with the result that the focus servo signal can be detected even when the absolute wavelength of the laser beam varies.

What is claimed is:

1. An integrated optical disc pickup comprising an optical waveguide in the form of a semiconductor layer or insulation layer provided on the surface of a substrate, a semiconductor laser disposed outside the waveguide, a beam splitter and a mode index lens provided on the path of propagation of a laser beam from the semiconductor laser through the waveguide and arranged in the order mentioned in a direction away from the laser, a diffraction grating provided on the path through the waveguide to be followed by the laser beam upon having its direction changed by the beam splitter after emanating from the laser, passing through the beam splitter and the mode index lens, being reflected from an optical disc disposed outside the waveguide and passing through the mode index lens, and photodetector means disposed on the paths of propagation through the waveguide of the two portions of the laser beam divided by the diffraction grating.

2. A pickup as defined in claim 1 wherein the mode index lens is a Luneburg lens.

3. A pickup as defined in claim 1 wherein the mode index lens is a geodesic lens.

4. A pickup as defined in claim 1 wherein the substrate is a glass substrate having an $Si_3N_4$ film formed thereon by vacuum evaporation.

5. A pickup as defined in claim 4 wherein the $Si_3N_4$ film has a thickness of 1 μm.

6. A pickup as defined in claim 2 wherein the waveguide is made of $Si_3N_4$, and the Luneburg lens is formed on the waveguide by depositing an $As_2S_3$ thereon by vacuum evaporation.

7. A pickup as defined in claim 2 wherein the Luneburg lens is 1 μm in thickness at its center, 1.5 mm in diameter and 3 mm in focal length and is positioned at a distance of 3.0 mm from the semiconductor laser for focusing a beam spot of 1 μm in diameter on the optical disc.

8. A pickup as defined in claim 3 wherein the geodesic lens is formed by diffusing Ti in the shape of a hemisphere.

9. A pickup as defined in claim 1 wherein the beam splitter comprises a recessed portion formed in the waveguide of the semiconductor layer or the insulation layer.

10. A pickup as defined in claim 9 wherein the waveguide is made of an $Si_3N_4$ film, and the beam splitter is a beam splitter of the transmission type formed by mesa-etching the waveguide photolithographically.

11. A pickup as defined in claim 1 wherein the beam splitter is of the diffraction grating type.

12. A pickup as defined in claim 1 wherein the diffraction grating is a transmission grating formed on the waveguide.

13. A pickup as defined in claim 12 wherein the waveguide is made of an $Si_3N_4$ film, and the diffraction grating is formed by depositing $As_2O_3$ on the waveguide by vacuum evaporation and subjecting the deposit to the photolithographical process.

14. A pickup as defined in claim 1 wherein the photodetector means comprises a first photodetector for detecting a focus servo signal from the optic disc and a second photodetector for detecting a tracking signal from the optical disc.

15. A pickup as defined in claim 14 wherein the second photodetector is so disposed that the primary diffracted beam obtained by dividing the laser beam into two portions by the diffraction grating is incident thereon.

16. A pickup as defined in claim 1 wherein the photodetector means comprises photodiodes formed on the waveguide.

17. A pickup as defined in claim 16 wherein the photodetector means comprises first and second photodetectors, and each of the photodetectors comprises a pair of photodiode devices divided and spaced apart from each other.

18. A pickup as defined in claim 12 wherein the diffraction grating has pits 20 μm in width and arranged at a pitch of 4 μm.

19. A pickup as defined in claim 1 which is provided with means for controllably driving the pickup transversely to the track of the optical disc and in the direction of the optical axis thereof.

20. A pickup as defined in claim 1 which is positioned perpendicularly to the plane of the optical disc.

21. A pickup as defined in claim 1 wherein the semiconductor laser is of the GaAlAs type, InGaAlP type or InGaAsP type.

22. A pickup as defined in claim 6 wherein the Luneburg lens 1 μm in thickness at its center, 1.5 mm in diameter and 3 mm in focal length and is positioned at a distance of 3.0 mm from the semiconductor laser for focusing a beam spot of 1 μm in diameter on the optic disc.

* * * * *